UNITED STATES PATENT OFFICE.

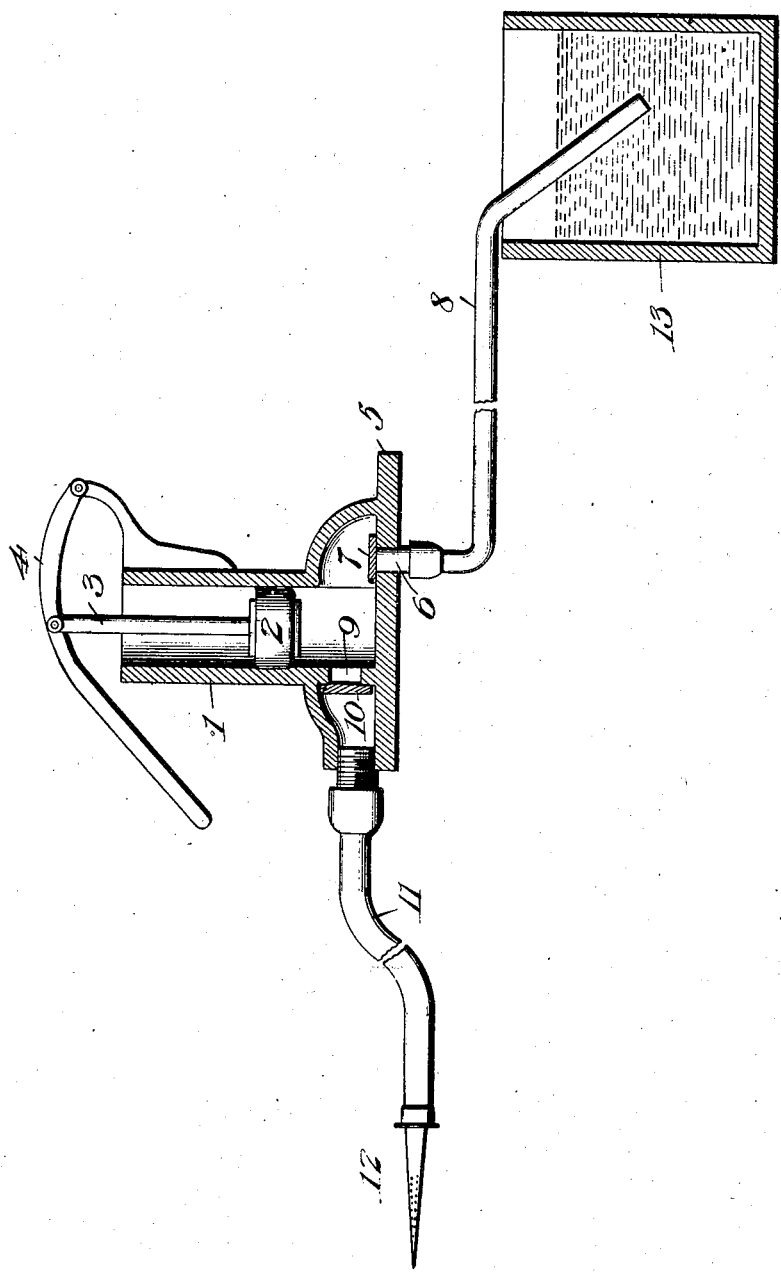

EDWARD E. BURKLE, OF BRIDGEPORT, OHIO.

PROCESS FOR CURING MEATS.

1,124,851.  Specification of Letters Patent.  Patented Jan. 12, 1915.

Application filed March 26, 1913. Serial No. 756,961.

*To all whom it may concern:*

Be it known that I, EDWARD E. BURKLE, a citizen of the United States of America, residing at Bridgeport, in the county of Belmont and State of Ohio, have invented certain new and useful Improvements in Processes for Curing Meats, of which the following is a specification.

This invention relates to the curing of meats and the like and, more particularly, to a method or process therefor.

The objects of my invention are, the production of a process whereby the meat is cured in one operation without any finishing process; one by which meat can be cured without waiting for the animal heat to be taken out of the meat with no danger of the meat spoiling; one that is a simple, cheap and efficient process whereby meats may be cured without the necessity of expensive refrigeration plants in which to store the meat until in condition for curing.

In carrying out my process I prefer to use the pumping method, a simple and efficient mechanism for the performance of which is shown in the accompanying drawing.

A cylinder 1 is provided with a suitable piston 2 carried on the rod or stem 3, the upper end of which has a pivotal connection with a suitable operating handle 4. The lower end of said cylinder 1, is provided with a base 5 through which it may be fastened to a table or other suitable support. Communicating with said cylinder 1, through the base 5, is a suitable inlet port 6 adapted to be closed by the valve 7, and said port communicates with the intake pipe 8. The cylinder 1 is further provided, near its lower end, with the outlet port 9, closed by a suitable valve 10, said port 9 being adapted to discharge the contents of cylinder 1 into a discharge pipe 11 communicating therewith. Discharge pipe 11 is provided, at its outer extremity, with the perforated needle-nozzle 12, adapted to penetrate the meat to be cured. A tank 13, for holding the meat curing solution, is placed at any convenient point for the reception of the free end of the intake pipe 8.

In curing meats by my process, take twenty-five gallons of pure, clean water, add twelve and one-half pounds of granulated sugar, six and one-half pounds of granulated saltpeter and two ounces of carbonate of soda thoroughly dissolved, to this add salt enough to make at least a ninety-five per cent. solution. A first requisite is that the meat should be soft and pliable as, if too firm, there is danger of the solution not spreading properly after leaving the needle.

In pumping bacon; insert the needle in the side of the bacon, making the insertions about four or five inches apart, being careful to insert it as far as possible so that the solution will reach the other side. Keep the pressure on the pump while withdrawing the needle so as to distribute the solution better. If the bacon is extra thick it may be necessary to pump it from both sides.

In pumping hams, insert the needle in the middle of the face of the ham on the fleshiest side of the bone with the point toward the hock end. With the needle in this position, pump in the solution until it begins to flow from the hock end. Now draw the needle back, but not out of the ham as the object is to make only one insertion, and force it in again with the point a little outward from the bone and pump the solution in until the ham gets well filled or swelled up tight. Now draw the needle back and force it down toward the end of the ham under the rump bone and pump this part full. Draw the needle back again and force it down on the other side of the bone with the point toward the large end of the ham and pump this part full. Always be sure to have the point of the needle reasonably close to the bottom of the ham, while pumping, so as to get the solution into the meat next to the skin side. The main object is to pump the ham full of the solution in all parts. The operator will have to use his judgment to some extent in this respect.

To pump shoulders, insert the needle in the fleshy part of the hock end, with the point toward the hock end, first on one side of the bone and then on the other, pumping each side full. Now insert the needle under the shoulder blade and pump full, then insert the needle on top of the shoulder blade and pump full. Be sure to get all parts of the shoulder well filled with the solution especially the joint of the shoulder blade.

With California hams, pump in the same way as described for the hock end of the shoulder.

To pump beef tongues, insert the needle in the large end of the tongue and pump full of the solution, then insert the needle in the middle of the tongue, running the point up to the small end and pump pulling the needle back as the tongue fills up.

In carrying out the operation of pumping meat, it is best to have the meat on a table or bench which slopes slightly and which is arranged with a receptacle to catch the solution that might otherwise be wasted. After the meat is pumped and drained a short time, lay it on the floor or bench in the cooler and sprinkle saltpeter over it and then sprinkle a little salt. Let the meat remain undisturbed until cured.

The curing requires the following times:— Bacon requires from two to four days, depending on the size of the bacon; ham requires from one to two weeks; shoulders and tongues require one week; California hams require four or five days, except when extra large, when one week is required. If it is desired to smoke the meat, which may be done at any time after curing, soak the meat in cold water for one hour, wash it and hang in the smoke house and smoke well. By this treatment meat cannot get too salty and will not be tough and there is practically no danger of its spoiling, if well pumped.

As stated before, the animal heat does not have to be taken out of the meat before treating. Hogs may be killed one day and cut up and pumped the next without any danger of the meat spoiling.

Having described my invention, what I claim as new and desire to secure by Letters Patent, is:—

In a process of curing meats, impregnating the same with an unheated solution consisting of water, granulated sugar, saltpeter, carbonate of soda and salt, sprinkling the meat so impregnated with saltpeter thereafter, sprinkling with salt and then allowing it to stand until cured.

In testimony whereof I hereunto affix my signature in presence of two witnesses.

EDWARD E. BURKLE.

Witnesses:
W. F. KRAUSE,
ROBERT H. CLAYLAND.